Aug. 22, 1950     C. S. WILLIAMSON     2,519,528
FISH STRINGING DEVICE
Filed Oct. 11, 1945
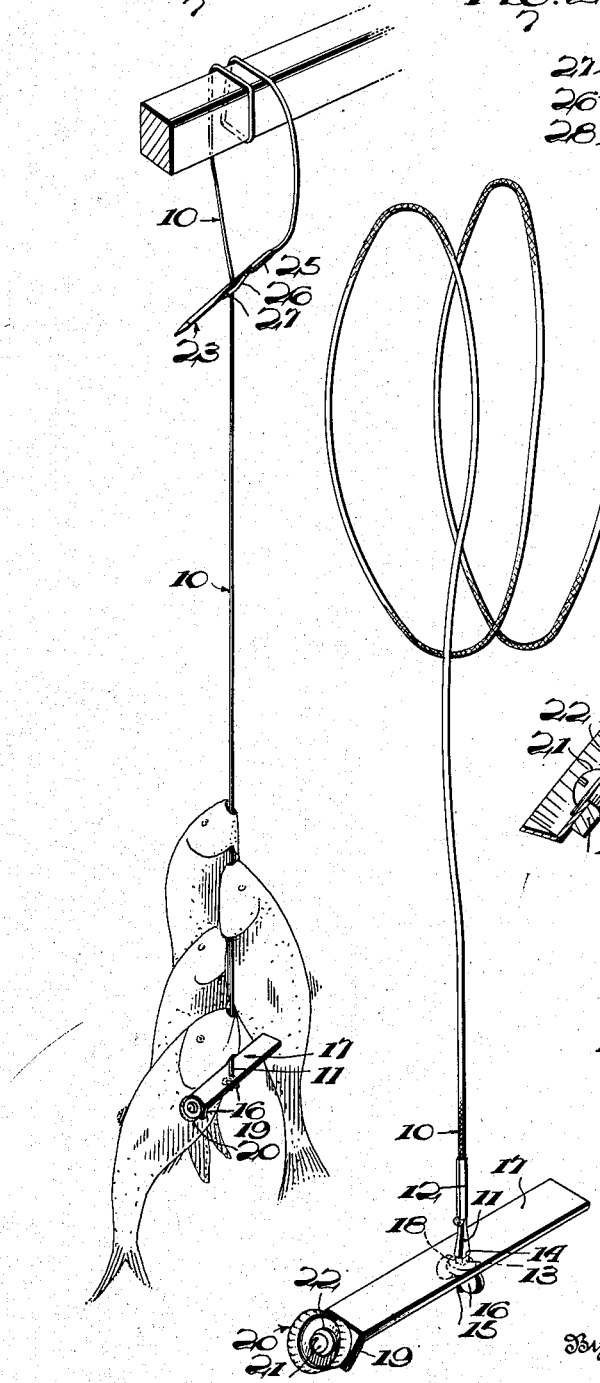
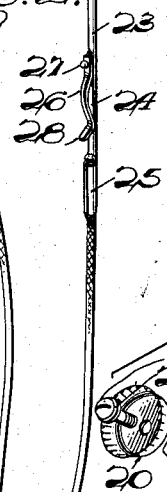
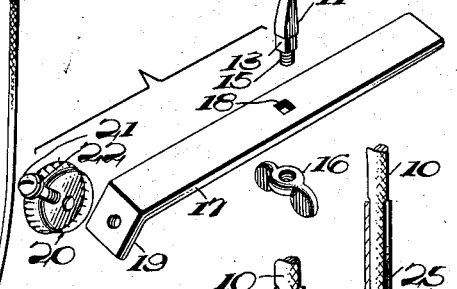
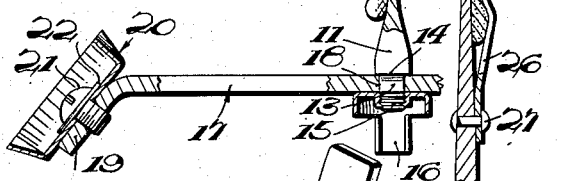
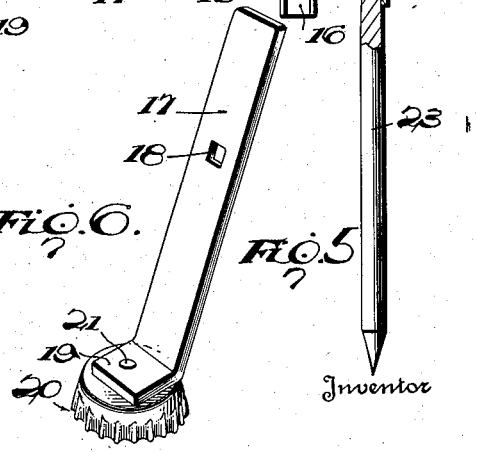
Inventor
Carl S. Williamson Patented Aug. 22, 1950

2,519,528

UNITED STATES PATENT OFFICE 2,519,528

FISH STRINGING DEVICE

Carl S. Williamson, Orangeburg, S. C.

Application October 11, 1945, Serial No. 621,801

4 Claims. (Cl. 224—7)

My invention relates to fish stringing devices.

An important object of the invention is to provide a device of the above-mentioned character which will permit the fish being removed from the stringing element by passing the same from the free end of the stringing element.

A further object of the invention is to provide a device of the above-mentioned character which will eliminate the necessity of moving the fish upwardly upon the stringing element, prior to their removal from such stringing element.

A further object of the invention is to provide means for holding the stringing element or line against turning in the mouth of the fish, when the stop or keeper is being removed.

A further object of the invention is to provide a scaling device carried by the removable stop or keeper.

A further object of the invention is to provide a pin or threading element to pass the line through the mouth of the fish and which is provided with a clip for detachable holding engagement with the line of stringing element, so that the line may be looped about a stationary object and properly secured thereto.

A further object of the invention is to provide a device of the above-mentioned character which is simple in construction and cheap to manufacture.

Other objects and advantages of the invention will be apparent during the course of the following description.

In the accompanying drawings, forming a part of this application, and in which like numerals are employed, to designate like parts throughout the same, Figure 1 is a perspective view of a fish stringing device embodying my invention and shown in use, Figure 2 is a similar view of the device, not in use, Figure 3 is an exploded perspective view of the keeper or stop element and associated elements, Figure 4 is a side elevation of the keeper or stop and associated elements, parts in section, and parts broken away, Figure 5 is a side elevation of the pin or threading element, parts in longitudinal section, and, Figure 6 is a perspective view of the keeper or stop removed, showing the same employed as a scaling implement.

In the drawings, wherein for the purpose of illustration is shown a preferred embodiment of my invention, the numeral 10 designates a flexible stringing element or line, preferably in the form of a cord.

The numeral 11 designates a coupling provided with a tube or socket 12, preferably formed integral therewith. This tube receives one end of the line 10, and the tube is then squeezed upon the line to have positive clamping engagement therewith, so that the line cannot be withdrawn from the tube. The coupling 11 has an extension or shank 13 which is square or polygonal in cross-section. The shank 13 is reduced with respect to the coupling 11 forming a stop shoulder 14. The shank has a cylindrical screw-threaded portion 15, for receiving a winged nut 16, as shown.

Adapted for coaction with the coupling 11 is a keeper or stop 17, in the form of a flat, rigid bar. This bar is provided at its transverse and longitudinal centers with an opening 18, which is square, for receiving the shank 13. This square opening holds the coupling 11 against turning movement with respect to the bar 17, when the winged nut is turned upon the screw threaded portion 15.

At one end, the bar 17 is bent to provide a laterally extending angular portion 19, which is disposed at an angle of 45° with relation to the bar 17. A metal crown cap 20 is mounted upon the outer face of the angular extension 19 and is detachably secured thereto by a screw 21 or the like, carrying a washer 22. This crown cap faces away from the angular extension. The crown cap is used as a scaling element to scale the fish.

The numeral 23 designates a threading element or pin, having a flattened portion 24, carrying a tube or socket 25. This tube or socket receives the opposite end of the line 10 and is squeezed or collapsed upon the line to have clamping engagement therewith so that the line cannot be removed from the tube. Arranged in opposed relation to the flattened portion 24, and extending longitudinally thereof, is a resilient clip 26, one end of which is rigidly attached to the pin 23 by a rivet 27 or the like. The free end of the clip is bent or curved longitudinally as shown at 28, so that a portion of the line 10 may be readily passed between the resilient clip and the flat portion 24 of the pin.

In use, the keeper or bar 17 is secured to the coupling 11, and the crown cap scaling element is carried by the bar 17. The pin 23 is employed to thread the line 10 through the mouth of each fish and the fish slide down the line 10 and the lowermost fish engages the bar 17. The fish may be placed in the water and the pin 23 may be forced into the ground, or the line 17 may be secured to a stationary object by passing or looping the line about such object, and then passing a portion of the line between the resilient clip 26 and the flat portion 24. The resilient clip securely clamps the line to the flat portion 24 against slipping. This use is illustrated in Figure 1. When it is desired to remove the fish from the line, it is not necessary to slide some or all of the fish up or back upon the line. The user will then hold the bar 17 in one hand and turn the wing nut by the other hand, unscrewing the same from the screw-threaded portion 15. The fish may then be removed from the free or lower end of the line. After the bar 17 has been removed from the shank 13, the bar may be used as a handle to manipulate the crown cap 26 in scaling the fish. This crown cap may be removed from the bar to clean the same.

It is to be understood that the form of my invention hereinbefore described is to be taken as a preferred example of the same and that various changes in the shape, size, and arrangement of parts may be resorted to, without departing from the spirit of my invention, or the scope of the sub-joined claims.

Having thus described my invention, what I claim is:

1. A fish stringing device, comprising a line, a coupling secured to the line, the coupling having a shank which is polygonal in cross section and a stop shoulder adjacent to the shank, said shank having a screw threaded portion, a bar having an opening between its ends and formed polygonal to receive the shank and hold it against turning movement with respect to the bar, the bar engaging against the stop shoulder, and a nut carried by the screw-threaded portion to clamp the bar against the stop shoulder.

2. A fish stringing device, comprising a line, a coupling secured to the line and having a shank which is polygonal in cross section and a stop shoulder adjacent to the shank, said shank having a screw-threaded portion, a keeper having a polygonal opening between its ends to receive the shank and hold it against turning movement with respect to the keeper, the keeper being adapted to engage the stop shoulder, a nut carried by the screw-threaded portion to clamp the keeper against the stop shoulder, and a pin secured to the opposite end of the line.

3. A fish stringing device, comprising a line, a pin secured to one end of the line, a resilient clip mounted upon the pin near the longitudinal center of the pin, the pin extending forwardly and rearwardly of the resilient clip for substantial distances, the clip extending longitudinally of the pin and having its forward end attached to the pin and held close to the pin and facing the forward end of the pin, the resilient clip having its rear end laterally outwardly inclined with respect to the pin and projecting toward the rear end of the pin, the clip serving to clamp a portion of the line to the pin, the portion of the pin to the rear of the clip being permanently secured to one end of the line, a coupling element secured to the opposite end of the line, and a keeper detachably connected to said coupling element.

4. A fish string device, comprising a line, a pin secured to one end of the line, the pin having a longitudinal recess in its side between its forward and rear ends, said recess forming an intermediate reduced portion, the pin extending forwardly and rearwardly of the intermediate reduced portion for substantial distances, a resilient clip mounted upon the pin adjacent to the reduced portion and disposed within the recess, the clip extending longitudinally of the pin and having its forward end attached to the pin and held close thereto and facing the forward end of the pin, the resilient clip having its rear end bent laterally outwardly and inclined with respect to the pin and projecting toward the rear end of the pin, the outer sides of the resilient clip being in substantial alignment with the side of the pin forwardly and rearwardly of the intermediate reduced portion for producing a slender construction, the clip serving to clamp a portion of the line to the pin, the portion of the pin to the rear of the clip being permanently secured to one end of the line, a coupling element secured to the opposite end of the line, and a keeper detachably connected to said coupling element.

CARL S. WILLIAMSON.

REFERENCES CITED

The following references are of record in the file of this patent:

UNITED STATES PATENTS

| Number | Name | Date |
|---|---|---|
| 204,496 | Mersellis | June 4, 1878 |
| 405,685 | Spencer | June 18, 1899 |
| 1,341,722 | Putney | June 1, 1920 |
| 1,417,759 | McNiece | May 30, 1922 |
| 1,500,613 | Halloway | July 8, 1924 |
| 1,674,045 | James | June 19, 1928 |
| 1,797,716 | Casper | Mar. 24, 1931 |
| 1,936,616 | Boye | Nov. 28, 1933 |

OTHER REFERENCES

"Modern Mechanix and Invention," page 77, Nov. 1933.